United States Patent
Suzuki et al.

(10) Patent No.: US 8,210,142 B2
(45) Date of Patent: Jul. 3, 2012

(54) VALVE OPENING/CLOSING TIMING CONTROL APPARATUS

(75) Inventors: Shigemitsu Suzuki, Takahama (JP); Naoto Toma, Kariya (JP); Yoji Kanada, Gamagori (JP); Hiroki Mukaide, Kariya (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 360 days.

(21) Appl. No.: 12/602,605

(22) PCT Filed: Sep. 8, 2008

(86) PCT No.: PCT/JP2008/066152
§ 371 (c)(1), (2), (4) Date: Dec. 1, 2009

(87) PCT Pub. No.: WO2009/037986
PCT Pub. Date: Mar. 26, 2009

(65) Prior Publication Data
US 2010/0175649 A1   Jul. 15, 2010

(30) Foreign Application Priority Data
Sep. 19, 2007   (JP) ................. 2007-242385

(51) Int. Cl.
*F01L 1/34*   (2006.01)
(52) U.S. Cl. .............. 123/90.17; 123/90.15; 464/160
(58) Field of Classification Search ........... 123/90.15, 123/90.17; 464/1, 2, 160
See application file for complete search history.

(56) References Cited

U.S. PATENT DOCUMENTS

| 5,738,056 | A | 4/1998 | Mikame et al. |
| 5,901,674 | A | 5/1999 | Fujiwaki |
| 6,439,181 | B1 | 8/2002 | Fujiwaki et al. |
| 6,439,184 | B1 | 8/2002 | Takenaka et al. |
| 6,684,835 | B2 * | 2/2004 | Komazawa et al. ....... 123/90.17 |
| 7,198,014 | B2 * | 4/2007 | Kanada et al. ............ 123/90.17 |
| 2002/0100445 | A1 | 8/2002 | Takenaka et al. |
| 2003/0121486 | A1 | 7/2003 | Komazawa et al. |
| 2006/0144357 | A1 | 7/2006 | Knecht et al. |

(Continued)

FOREIGN PATENT DOCUMENTS
EP   1 672 188 A1   6/2006
(Continued)

OTHER PUBLICATIONS

English translation of the International Preliminary Report on Patentability issued on Apr. 7, 2010 by The International Bureau of WIPO in International Application No. PCT/JP2008/066152.

(Continued)

*Primary Examiner* — Ching Chang
(74) *Attorney, Agent, or Firm* — Buchanan Ingersoll & Rooney PC (57) ABSTRACT

A valve opening/closing timing control apparatus includes a phase displacing mechanism for displacing relative phase between a drive-side rotational member and a driven-side rotational member rotatable in unison with a cam shaft, a locking mechanism capable of locking the relative phase to an intermediate locking phase suitable for starting and releasing this lock by a work fluid when needed and an urging mechanism configured to provide an urging function for urging the phase displacing mechanism toward an advancing side in a restricted range between an intermediate restricting phase located more on the retarding side than the intermediate locking phase and a most retarding phase.

3 Claims, 7 Drawing Sheets

U.S. PATENT DOCUMENTS

| | | |
|---|---|---|
| 2008/0022953 A1 | 1/2008 | Kanada et al. |
| 2009/0025668 A1 | 1/2009 | Matsusaka et al. |
| 2010/0175650 A1 | 7/2010 | Suzuki et al. |

FOREIGN PATENT DOCUMENTS

| | | |
|---|---|---|
| GB | 2 437 305 A | 10/2007 |
| JP | 9-324613 A | 12/1997 |
| JP | 2002-227621 A | 8/2002 |
| JP | 2002-295276 A | 10/2002 |
| JP | 2004-60572 A | 2/2004 |
| JP | 2006-37886 A | 2/2006 |
| JP | 2006-144766 A | 6/2006 |
| JP | 2006-322409 A | 11/2006 |
| JP | 2006-348926 A | 12/2006 |
| JP | 2007-132272 A | 5/2007 |
| WO | WO 2006/011648 A1 | 2/2006 |

OTHER PUBLICATIONS

International Search Report of Application No. PCT/JP2008/066152 dated Dec. 9, 2008.

Written Opinion of the International Searching Authority (Japanese Patent Office) of Application No. PCT/JP2008/066152 dated Dec. 9, 2008.

Supplementary European Search Report dated Sep. 7, 2011, issued in European Patent Application No. 08831906.6-2311.

Supplementary European Search Report dated Sep. 7, 2011, issued in European Patent Application No. 08832094.0-2311.

Informal comments submitted in International Patent Application No. PCT/JP2008/066152.

* cited by examiner

VALVE OPENING/CLOSING TIMING CONTROL APPARATUS

TECHNICAL FIELD

The present invention relates to a valve opening/closing timing control apparatus for controlling opening/closing timing of at least one of an intake valve and an exhaust valve of an internal combustion engine.

BACKGROUND ART

The convention has implemented a valve timing control apparatus for changing opening/closing timing of an intake valve and/or an exhaust valve according to an operational condition of an internal combustion engine ("engine"). For instance, there is known a mechanism for changing the opening/closing timing of the intake valve which is opened/closed in association with rotation of a cam shaft, by changing a rotational phase of the cam shaft relative to a crank shaft. Incidentally, the intake valve and the exhaust valve each has its own timing favorable for starting the engine. And, this opening/closing timing often differs from the opening/closing timing of the same valve during traveling of the vehicle. More particularly, the rotational phase of the cam shaft at the time of start of engine is often located at an intermediate position between the angle advancing side and the angle retarding side. For mechanically fixing this position as an intermediate locking phase suitable for engine start, there is known a variable valve timing mechanism having a locking mechanism for locking the rotational phase of the cam shaft at the intermediate locking phase (see. e.g. Patent Document 1). With this variable valve timing mechanism, after the engine starts at the intermediate locking phase and subsequently enters its operational state and when the hydraulic pressure builds up thereafter, the locking mechanism is released, thus allowing phase control suitable for the operational state.

Further, in order to ensure change, at the time of engine start, from the retarding phase side to the intermediate locking phase side (intermediate locking position) that is the relative phase suitable for engine start, a valve timing adjusting apparatus is known that has an (angle) advance assisting spring for assisting the phase displacement toward the advancing side (see e.g. Patent Document 2). With this valve timing adjusting apparatus, the range of urging phase of the advance assisting spring is set to the sum of the intermediate locking phase and 10 degrees, as measured from the maximal retarding phase. With this arrangement, even in the event of drop in the hydraulic pressure at the time of stop of the engine, the relative phase will have been displaced to the position beyond the intermediate locking phase, due to the urging force of the advance assisting spring, and at the time of start of the engine, by a cam reaction force, the relative phase will be displaced toward the retarding side, against the urging force of the advance assisting spring and the relative phase will be locked eventually at the intermediate locking position.

With the above-described valve opening/closing timing control technique according to Patent Document 2, at the time of stop of the engine, with utilization of the urging force of the advance assisting spring, the relative phase between the crank shaft and the cam shaft is displaced to a phase slightly beyond the intermediate locking phase; whereas, at the time of the start of the engine, the relative phase of the cam shaft is locked to the intermediate locking phase by means of the cam reaction force, and the force resulting from e.g. viscosity of oil, effective in the retarding direction, thus improving the start performance of the engine. However, once the engine has started, it is desired that the phase should be displaced slightly from the intermediate locking phase to the retarding side in order to improve emission performance and/or increase the torque at the time of low temperature. In the course of this displacement from the intermediate locking phase toward the retarding side, the urging force of the advance assisting spring acts as "resistance", thus preventing this displacement process from proceeding smoothly.

Further, for realizing speedy displacement of the relative phase from the retarding side to the intermediate locking phase, it is desired that the urging force of the advance assisting spring be strong. However, if the cam reaction force, and the force resulting from e.g. viscosity of oil, effective in the retarding direction, are weak, the displacement from the intermediate lock position to the retarding side needs to rely on the control oil pressure in overcoming the resistive urging force of the advance assisting spring. For this reason, it is needed to set in advance the strength of the advance assisting spring such that the control operation to the retarding side is possible even with the minimal oil pressure.

Patent Document 1: Japanese Patent No. 3211713 (e.g. paragraphs 36-57)

Patent Document 2: Japanese Patent Application "Kokai" No. 2002-227621 (e.g. paragraphs 50-59).

DISCLOSURE OF THE INVENTION

In view of the above-described drawbacks of the conventional valve opening/closing timing control techniques, the object of the present invention is to provide a valve opening/closing timing control apparatus which allows smooth slight displacement from the intermediate locking phase suitable for engine start toward the retarding side, thus achieving emission performance improvement and torque increase.

For accomplishing the above-noted object, a valve opening/closing timing control apparatus according to the present invention, comprises:

a phase displacing mechanism for displacing relative phase between a drive-side rotational member rotatable in synchronism with a crank shaft of an internal combustion engine and a driven-side rotational member arranged coaxially relative to the drive-side rotational member and rotatable in unison with a cam shaft for opening/closing at least one of an intake valve and an exhaust valve of the internal combustion engine, by feeding/discharging a work fluid to/from each one of two kinds of pressure chambers whose capacities are variable in complementing manner with each other by means of a movable partition;

a locking mechanism capable of locking said relative phase to an intermediate locking phase suitable for starting the internal combustion engine and releasing this lock by a work fluid when needed; and an urging mechanism configured to provide an urging function for urging said phase displacing mechanism toward an advancing side in a restricted range between an intermediate restricting phase located more on the retarding side than said intermediate locking phase and a most retarding phase.

Normally, an internal combustion engine ("engine") is stopped during its idling state. So, the relative phase provided by the phase displacing mechanism is in a retarding region in this situation. With the present invention, if engine stop is requested in the retarding region, this relative phase is speedily shifted to the intermediate restricting phase by a displacing force due to the urging force toward the advancing side generated by the urging mechanism and the work fluid fed to the phase displacing mechanism. Thereafter, under the effect of the displacing force provided by the work fluid, the relative phase reaches the intermediate locking phase and then becomes locked thereto by the locking mechanism. Therefore, the engine can be restarted at the intermediate locking phase suitable for engine start. Further, at this intermediate locking phase, if the work fluid is controlled to release the lock by the locking mechanism thereby to allow displacement of the phase displacing mechanism toward the retarding side, the relative phase will be displaced toward the retarding side due to the displacing force of the work fluid and the cam reaction force. When the relative position being displaced reaches the intermediate restricting phase suitable for emission improvement and torque increase after start of the engine, the urging force provided by the urging mechanism acts as a resistance to inhibit the relative phase from being displaced further toward the retarding phase side beyond the intermediate restricted position. With these functions, according to the valve opening/closing timing control apparatus of the present invention, the engine can be started at the intermediate locking phase suitable for engine start. Once the engine has started, the phase can be smoothly shifted from this intermediate locking phase to the intermediate restricting phase for enabling emission improvement and torque increase. Incidentally, although the above-described intermediate restricting phase is a phase on the retarding phase side relative to the intermediate locking phase, this intermediate restricting phase yet satisfies the requirement of enabling engine start.

The above-described emission improvement and torque increase at the time of low temperature are especially important as operations after engine start. For this reason, according to one preferred embodiment of the present invention, upon lapse of a predetermined period, e.g. upon lapse of a few tens of seconds, subsequent to the start of the internal combustion engine at said intermediate locking phase, said relative phase is displaced to said intermediate restricting phase. This arrangement allows for smooth and automatic implementation of the displacement of the relative phase, requested upon lapse of the predetermined period, from the intermediate locking phase suitable for engine start to the intermediate restricting phase suitable for torque increase under low temperature condition and emission improvement.

According to one preferred mode of implementing said locking mechanism, this locking mechanism includes:
  a first locking piece and a second locking piece which are provided on one of said drive-side rotational member and said driven-side rotational member in a spaced apart relationship in the phase displacing direction;
  a retaining recess provided in the other rotational member for allowing insertion therein of said first locking piece and said second locking piece so as to lock said relative phase; and
  a restriction assisting retaining recess having opposed ends and having a shallower depth than said retaining recess at an advancing side end thereof and configured for allowing relative displacement of said first locking piece in the retarding direction in a region from said intermediate locking phase to said intermediate restricting phase.

With the above-described arrangement, when the phase is to be displaced from the intermediate locking phase with both the first locking piece and the second locking piece inserted in the retaining recess to the intermediate restricting phase, first, the work fluid is fed to the locking mechanism so as to elevate the first locking piece and the second locking piece to the level of the depth of the restriction assisting retaining recess, whereby the lock is released. Then, the further phase displacement toward the intermediate restricting phase after the release of lock is restricted as the first locking piece comes into contact with the terminal end of the restriction assisting retaining recess. The stopper function provided by this cooperation between the first locking piece and the restriction assisting retaining recess and the above-described stopper function provided by the urging mechanism together allow for stable retention of the intermediate restricting phase.

According to one preferred embodiment of the present invention, the inventive apparatus further comprises:
  a first pump driven by said internal combustion engine for feeding work fluid to said phase displacing mechanism;
  a second pump driven by a drive source different from said internal combustion engine for feeding work fluid to said phase displacing mechanism; and
  wherein a minimal urging force of said urging mechanism between said intermediate restricting phase and the most retarding phase is set so as to override the displacing force toward the retarding phase side provided by said phase displacing mechanism fed with the work fluid at a minimal pressure from said first pump.

If a second pump that can act, when needed, as a substitute for the first pump is provided as described above, it is possible for the second pump to compensate for any shortage in pressure which occurs in the work fluid provided by the first pump in association with engine stop. Therefore, unlike the conventional apparatus disclosed in Patent Document 1 described above, there is no need to set the urging force of the urging mechanism to override the displacing force in the retarding direction by the minimal-pressure work fluid provided by the first pump. With this arrangement, the returning from the retarding phase region to the intermediate restricting phase can take place in a speedy manner. Further, preferably, in order to realize more reliable retarding control, the second pump is activated if the relative phase is to be displaced in the retarding direction beyond said intermediate restricting phase when the work fluid fed by the first pump is at the minimal pressure.

According to a still further arrangement, in case said relative phase is off said intermediate locking phase region at the time of issuance of request for stopping the internal combustion engine, said second pump is activated during a period from the issuance of the engine stop request to detection of stop of the engine, so as to assist the operation for returning the relative phase to the intermediate locking phase. When the internal combustion engine is stopped, the first pump too is stopped. With this, the pressure of the work fluid provided by the first pump will be lost. However, this loss is compensated for by the pressure of work fluid provided by the second pump that is driven by a different power source than the engine. Therefore, when the engine is stopped at an retarded phase, there is provided an increased displacing force together with the urging force of the urging mechanism from the retarding phase region to the intermediate locking phase, so that the returning to the intermediate locking phase is effected speedily.

BEST MODE OF EMBODYING THE INVENTION

Figure 1:
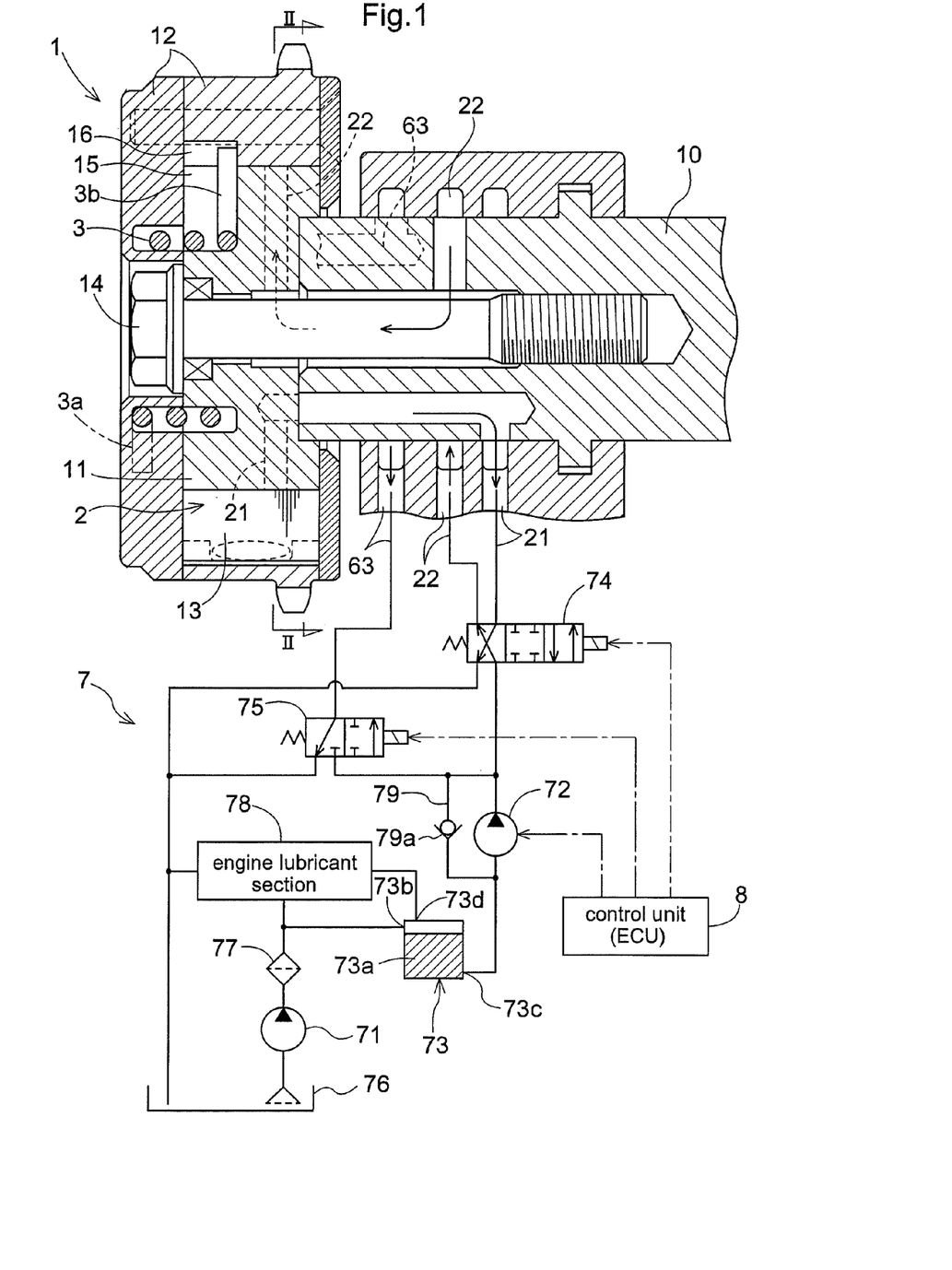
FIG. 1 is a cutaway section view showing a general construction of a valve opening/closing timing control apparatus according to the present invention.
Figure 2:
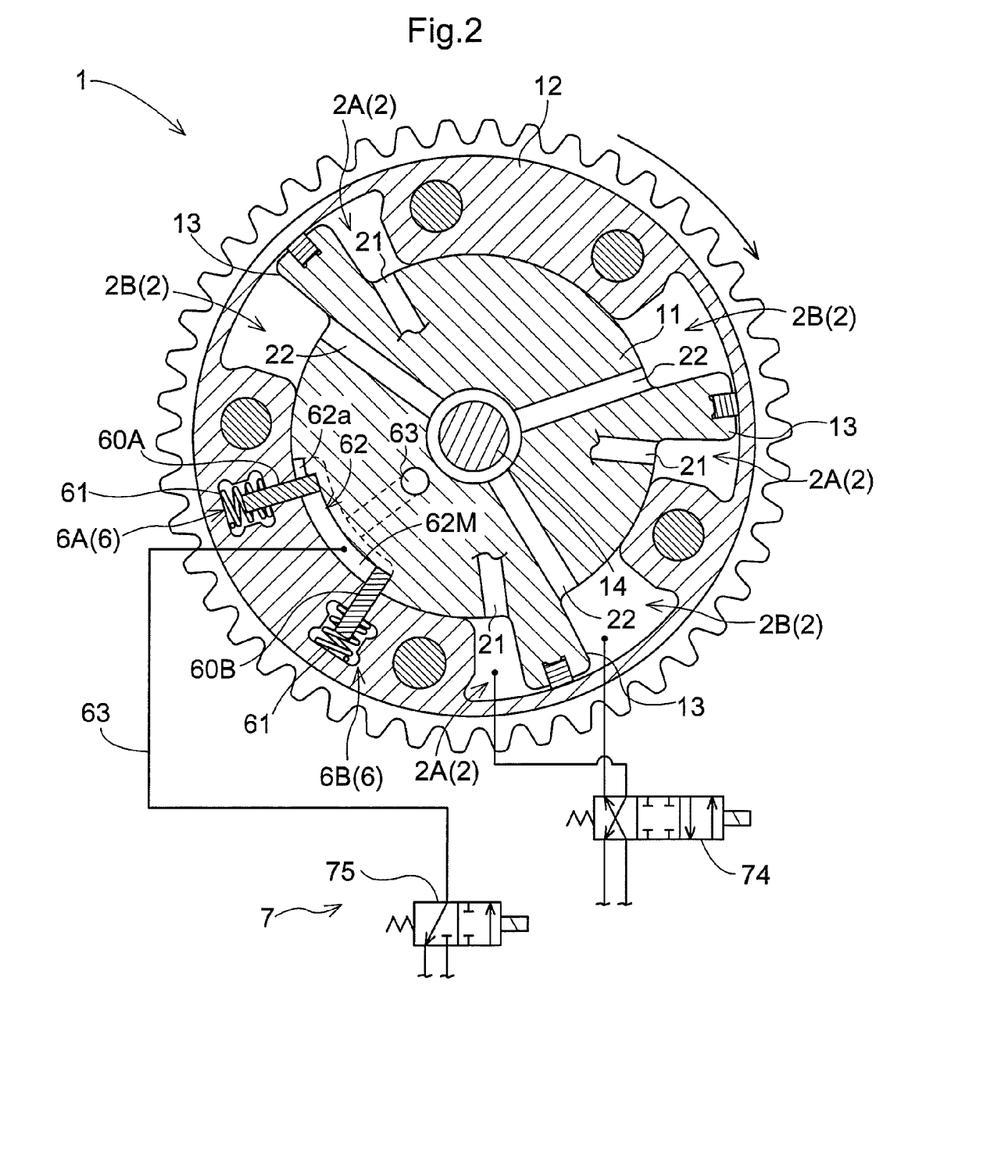
FIG. 2 shows a section II-II in FIG. 1 under one operational condition of the valve opening/closing timing control apparatus.

Next, one embodiment of the present invention will be described with reference to the accompanying drawings. FIG. 1 is a section view schematically showing the construction of a valve opening/closing timing control apparatus according to the present invention. FIG. 2 is a section view taken along a line II-II in FIG. 1, as a plane view schematically showing a condition of a phase displacing mechanism under one operational state. Numeral 1 in the figures denotes the phase displacing mechanism. This phase displacing mechanism 1 includes a drive-side rotational member 12 rotatable in synchronism with an internal combustion engine ("engine") and a driven-side rotational member 11 arranged coaxially with the drive-side rotational member 12. In the instant embodiment, there is illustrated an exemplary arrangement of the driven-side rotational member 11 being disposed on the inner side of the drive-side rotational member 12. And, the drive-side rotational member 12 is provided in the exemplary form of a pulley or a sprocket as shown. The drive-side rotational member 12 receives rotational force from a crank shaft of the engine via an unillustrated belt or chain. The driven-side rotational member 11 is fixed on a cam shaft 10 via a bolt 14 and is rotatable in unison with the drive-side rotational member 12, to rotate the cam shaft 10, thus opening/closing an intake valve and/or an exhaust valve of the engine.

Between the drive-side rotational member 12 and the driven-side rotational member 11, there are formed cavities 2. Each cavity 2 is divided into two kinds of pressure chambers 2A and 2B by means of a vane 13 acting as a movable partition therebetween. While the total capacity of the cavity remains fixed, as the position of the vane 13 is varied within the cavity, respective capacities of the two kinds of pressure chambers 2A and 2B are varied correspondingly in a mutually complimentary manner. And, in association with this change of capacities, the opening/closing timings of the intake valve and/or exhaust valve for the piston-operating engine are changed. Incidentally, the partition between the pressure chamber 2A and the pressure chamber 2B is not limited to the vane 13 provided in the form of block shown in FIG. 2, but can be provided by a plate-like member, instead.

In the instant embodiment, the phase displacing mechanism as a whole rotates clockwise. FIG. 2 shows a condition of an intermediate locking phase that is set as being suitable for start of the internal combustion engine. This intermediate locking phase is set within an intermediate region between a most retarding phase where the relative phase of the driven-side rotational member 11 relative to the drive-side rotational member 12 is most retarded and a most advancing phase where the relative phase of the driven-side rotational member 11 relative to the drive-side rotational member is most advanced. And fixedly maintained, i.e. locked, by a locking mechanism 6 to be described later. With the valve opening/closing timing control apparatus of the present invention, at the time of stopping the engine, the relative phase between the drive-side rotational member 12 and the driven-side rotational member 11 is displaced to this intermediate locking phase and maintained thereto by the locking mechanism 6. Therefore, at this intermediate locking phase condition, the engine can be started in a reliable manner.

Incidentally, in the present invention, slightly on the retarding side than this intermediate locking phase, there is set an intermediate restricting phase to be detailed later. At this intermediate restricting phase, during an idling condition of the engine after its start, improvement of emission performance and torque increase can be achieved, as compared with the intermediate locking phase.

Upon release of the lock by the locking mechanism 6 from the condition shown in FIG. 2 and if work fluid is fed into the pressure chamber 2A and discharged from the pressure chamber 2B, due to corresponding increase in the relative capacity of the pressure chamber 2A as compared to that of the other pressure chamber 2B, the phase of the drive-side rotational member 11 is controlled or displaced toward the retarding side relative to the drive-side rotational member 12. Conversely, if the work fluid is fed into the pressure chamber 2B and discharged from the pressure chamber 2A, the phase of the drive-side rotational member 11 is controlled or displaced toward the advancing side relative to the drive-side rotational member 12. For this reason, in the following explanation of the present embodiment, the pressure chamber 2A will be referred to as an advancing chamber and the pressure chamber 2B will be referred to as a retarding chamber, respectively. Further, in FIG. 1, a passage 21 communicating to the retarding chamber 2A will be referred to as a retarding passage and a passage 22 communicating to the advancing chamber 2B will be referred to as an advancing passage, respectively. It should be noted here that the retarding chamber 2A and the advancing chamber 2B are not completely sealed, so that if an amount of work oil exceeding the respective capacity thereof is fed thereto, the excess amount of fluid will leak to the outside of the phase displacing mechanism 1. An example of the work fluid is engine oil and this leaking excess work fluid or engine oil will be recovered together with an amount of work fluid (engine oil) fed to the respective parts of the engine.

Between the drive-side rotational member 12 and the driven-side rotational member 11, there is interposed a torsion spring 3 as an "urging mechanism" for urging the phase displacing mechanism 1 in the direction toward the intermediate locking phase. This torsion spring 3 provides an urging force (phase displacement assisting torque) for urging the driven-side rotational member 11 in the advancing direction relative to the drive-side rotational member 12. Namely, the drive-side rotational member 11 tends to lag, in its displacement, relative to the drive-side rotational member 12, due to resistance received from a valve spring of the intake valve or exhaust valve and/or from the phase displacing mechanism 1. The torsion spring 3 acts to restrict this lag, i.e. displacement of the phase toward the retarding side, more particularly, displacement of the phase toward the retarding side, in a region between the intermediate restricting phase and the most retarding phase and provides also a stopper function in the course of displacement from the intermediate locking phase to the intermediate restricting phase after start of the engine.

Referring to FIG. 1, a hydraulic circuit 7 includes a first pump 71 driven by the engine for effecting feeding of oil (this also is engine oil) as the work fluid, a second pump 72, and a work oil reservoir 73 disposed between the first pump 71 and the second pump 72 and capable of reserving an amount of the work oil. The second pump 72 is disposed on the downstream of the first pump 71 and is driven by a power source separate from the engine for effecting feeding of the work oil. In addition to the above, the hydraulic circuit 7 further includes a first control valve 74 for controlling feeding of the work oil to the pressure chambers 2, and a second control valve 75 for controlling feeding of the work oil to the locking mechanism 6. This hydraulic circuit 7 still further includes a control unit (ECU) 8 as a controlling means for controlling operations of the second pump 72, the first control valve 74 and the second control valve 75.

The control unit 8 receives signals from a sensor for detecting a crank angle and a sensor for detecting an angular (rotational) phase of a cam shaft. Based upon detection results of these sensors, the control unit 8 calculates a relative phase between the driven-side rotational member 11 and the drive-side rotational member 12 and calculates also a difference, if any, between the calculated relative phase and the intermediate locking phase together with a direction of this displacement (the advancing phase direction or retarding phase direction). And, the control unit 8 operates in such a manner that at the time of stopping engine, the relative phase between the drive-side rotational member 12 and the driven-side rotational member 11 may be displaced to the intermediate locking phase and then locked at this phase by the locking mechanism 6. Further, the control unit 8 stores, within its memory, optimum relative phases according respectively to various operational states of the engine, so that in accordance with each particular operational state (e.g. rotational speed of the engine, temperature of cooling water) separately detected, an optimum relative phase therefor may be obtained. Therefore, this control unit 8 operates also to render the relative phase optimum for any particular operational state of the engine at that moment. Moreover, this control unit 8 further receives e.g. ON/OFF information of an ignition key, information from an oil leak sensor for detecting leak of the engine oil, etc.

The first pump 71 is a mechanically driven hydraulic pump driven as receiving the drive force of the crank shaft of the engine. In operation, this first pump 71 draws the work oil reserved in an oil pan 76 via an inlet port and discharges this work oil to the downstream side via a discharge port. This discharge port of the first pump 71 is communicated via a filter 77 to an engine lubricant section 78 and a work oil reservoir 73. In this, it is noted that the engine lubricant section 78 includes all parts or components required for feeding of the work oil to the engine and its peripherals.

Further, the second pump 72 is constructed as an electrically driven pump driven by a power source different from the engine, in this case, the different power source being an electric motor in particular. With this arrangement, the second pump 72 is rendered operable according to operation signals from the control unit 8, irrespectively or independently of whatever operational state of the engine. In operation, this second pump 72 draws the work oil reserved in the work oil reservoir 73 through its inlet port and discharges this work oil to the downstream side through its discharge port. This discharge port of the second pump 72 is communicated to the first control valve 74 and the second control valve 75. Further, the hydraulic circuit 7 includes a bypass passage 79 in parallel with the second pump 72, the bypass passage 79 being configured for establishing communication between the passage on the upstream side of the second pump and the passage on the downstream side of the same This bypass passage 79 incorporates therein a check valve 79a.

The work oil reservoir 73 is disposed between the first pump 71 and the second pump 72 and includes a reservoir chamber 73a capable of reserving a fixed amount of work oil. This work oil reservoir 73 further includes a first communication port 73a for communicating the reservoir chamber 73a to the passage downstream of the first pump 71, a second communication port 73b provided at a lower position than the first communication port 73a and configured for communicating the reservoir chamber 73a to the passage upstream of the second pump 72, and a lubricant communication port 73d provided at a higher position than the first communication port 73b and configured for communicating the reservoir chamber 73a to the engine lubricant section 78. And, the capacity of the reservoir chamber 73a of the work oil reservoir 73 is set such that the capacity portion of its area that is lower than the first communication port 73b and higher than the second communication port 73c may be equal to or greater than the amount (volume) of work oil needed to be fed by the second pump 72 under stopped state of the first pump 71.

Under the stopped state of the engine, namely, under the stopped condition of the first pump 71 driven thereby, the second pump 72 effects feeding operation for feeding the work oil to a fluid pressure chamber 4 and the locking mechanism 6. Accordingly, the capacity of the reservoir chamber 73a of the work oil reservoir 73 is set to be equal to or greater than an added-up capacity of the capacities of the fluid pressure chamber 4 and an engaging recess 51 of the locking mechanism 5 and the capacities of the pipes or the like extending from these components to the second pump 72. With this arrangement, under the stopped condition of the first pump 71, the second pump 72, instead, can effect the displacement of the relative phase between the drive-side rotational member 12 and the driven-side rotational member 11 to a target relative phase.

As the first control valve 74, it is possible to employ e.g. a variable electromagnetic spool valve configured to displace a spool slidably disposed within a sleeve, against a spring, in response to power supply to a solenoid from the control unit 8. This first control valve 74 includes an advancing port communicated to the advancing passage 22, a retarding port communicated to the retarding passage 21, a feeding port communicated to the passage downstream of the second pump 72, and a drain port communicated to the oil pan 76. And, this first control valve 74 is configured as a three-position control valve capable of effecting three modes of control, namely, an advancing control in which communications are established between the advancing port to the feeding port, and between the retarding port and the drain port, a retarding control in which communications are established between the retarding port an the feeding port and between the advancing port and the drain port, and a hold control in which the advancing port and the retarding port are closed. And, the first control valve 74 executes the advancing control or the retarding control under the operational control by the control unit 8.

As the second control valve 75, it is possible to employ a variable electromagnetic spool valve, like the first control valve 74. This second control valve 75 includes a lock port communicated to a locking passage 63 as the work oil passage of the locking mechanism 6, a feeding port communicated to the passage downstream of the second pump 72, and a drain port communicated to the oil pan 76. And, this second control valve 75 is configured as a two-position control valve capable of executing two modes of control, namely, a lock releasing control in which communication is established between the locking port and the feeding port and a locking control in which communication is established between the restricting port and the drain port. And, the second control valve 75 effects control of the locking mechanism 6 under the operational control of the control unit 8. The locking passage 63 interconnecting between this second control valve 75 and the locking mechanism 6 is independent of the passages interconnecting between the advancing passage 22 or the retarding passage 21 formed inside the phase displacing mechanism 1 to the first control valve 75. So, the control operations for feeding/discharging work oil to/from the locking mechanism 6 can be done, independently of the control operations for feeding/discharging work oil to/from the retarding chamber 2A or the advancing chamber 2B.

Figure 3:
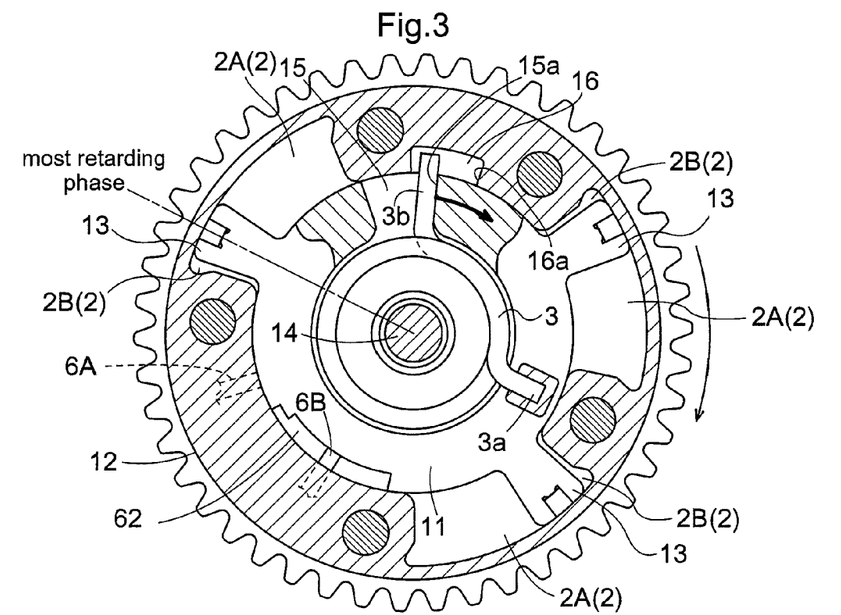
FIG. 3 is a diagram showing the valve opening/closing timing control apparatus at a most retarding phase.

The torsion spring 3, as shown in FIGS. 1 and 3, has its one end 3a fixed to the drive-side rotational member 12 and its other end 3b that can come into contact with a contact face 15a which is a lateral face along the axial direction of a radial opening 15 provided in the driven-side rotational member 11. Further, the leading end of the end 3b is inserted in a spring receiving recess 16 defined in the drive-side rotational member 12 and extending along the radial direction.

Figure 4:
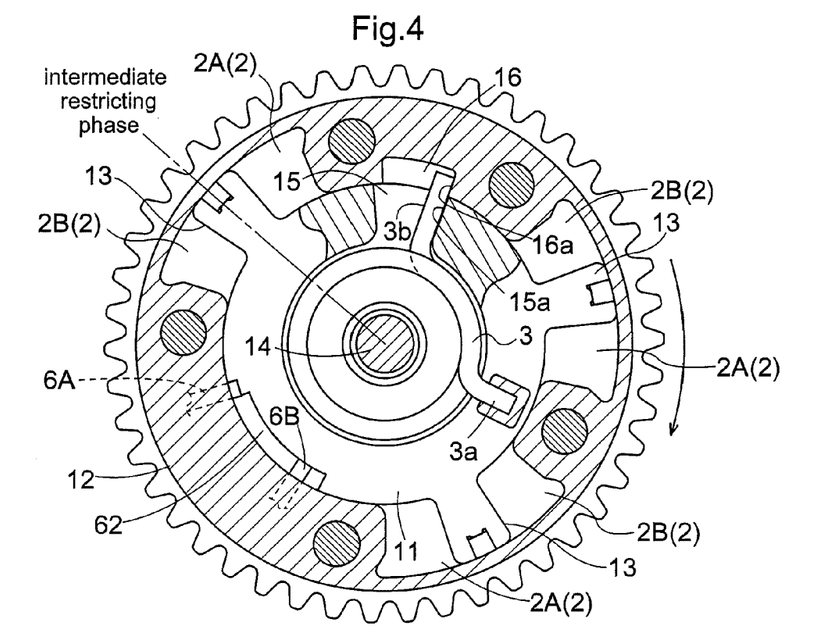
FIG. 4 is a diagram showing the valve opening/closing timing control apparatus at an intermediate restricting phase.
Figure 5:
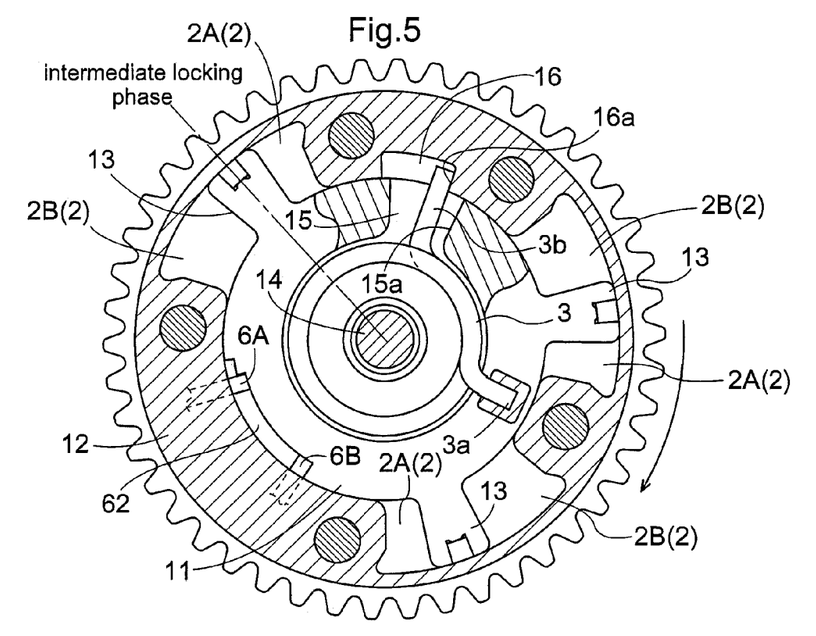
FIG. 5 is a diagram showing the valve opening/closing timing control apparatus at an intermediate locking phase.
Figure 6:
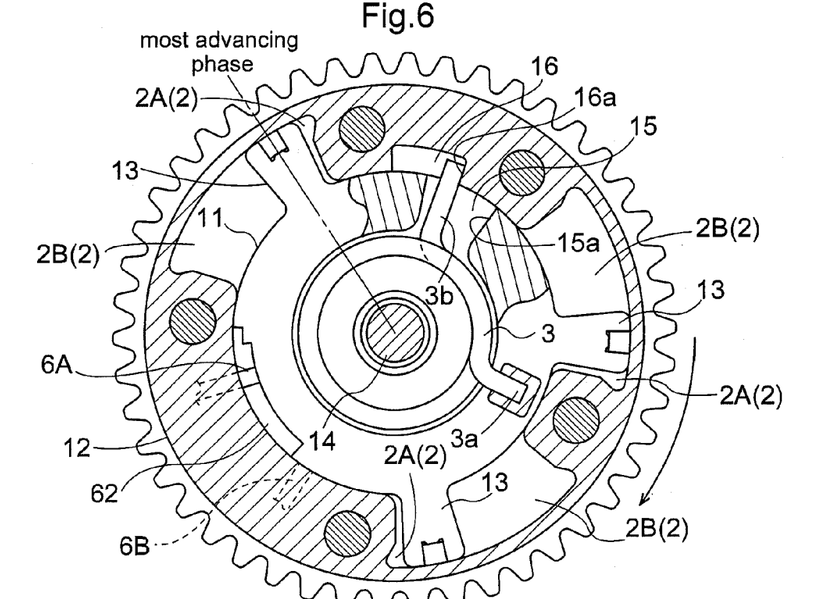
FIG. 6 is a diagram showing the valve opening/closing timing control apparatus at a most advancing phase.

FIGS. 3 through 6 show transitions of the relative phase between the drive-side rotational member 12 and the driven-side rotational member 11. FIG. 3 shows the most retarding phase state, FIG. 4 shows an intermediate restricting phase state, FIG. 5 shows the intermediate locking phase state and FIG. 6 shows a most advancing phase state, respectively. That is to say, in association with clockwise rotation of the driven-side rotational member 11 relative to the drive-side rotational member 12, there occurs transition from the most retarding phase, via the intermediate restricting phase and the intermediate locking phase, to the most advancing phase.

As may be understood from the transition diagram of these relative phases, the torsion spring 3 is configured to provide its urging force for urging the driven-side rotational member 11 toward the advancing side, only in the pre-defined limited range from the most retarding phase to the intermediate restricting phase. In other words, the effective range of the urging force 3 is from the relative phase between the driven-side rotational member 11 and the drive-side rotational member 12 being at the most retarding phase (see FIG. 3) to the relative phase being substantially at the intermediate restricting phase (see FIG. 4). And, only in this urging force effective range, the leading end of the end 3b of the torsion spring 3 comes into contact with the contact face 15a to urge the driven-side rotational member 11 in the advancing direction. However, at this intermediate restricting phase, the leading end of the end 3b of the torsion spring 3 comes into contact with a stopper face 16a of the spring receiving recess 16, thus inhibiting any further urging of the driven-side rotational member 11. Therefore, during the transition of the relative phase beyond the intermediate restricting phase via the intermediate locking phase (see FIG. 5) to the most advancing phase (see FIG. 6), the urging force provided by the torsion spring 3 to the driven-side rotational member 11 becomes zero. This relationship between the relative phase and the urging force of the torsion spring 3 is illustrated in the graph in FIG. 7.

Figure 7:
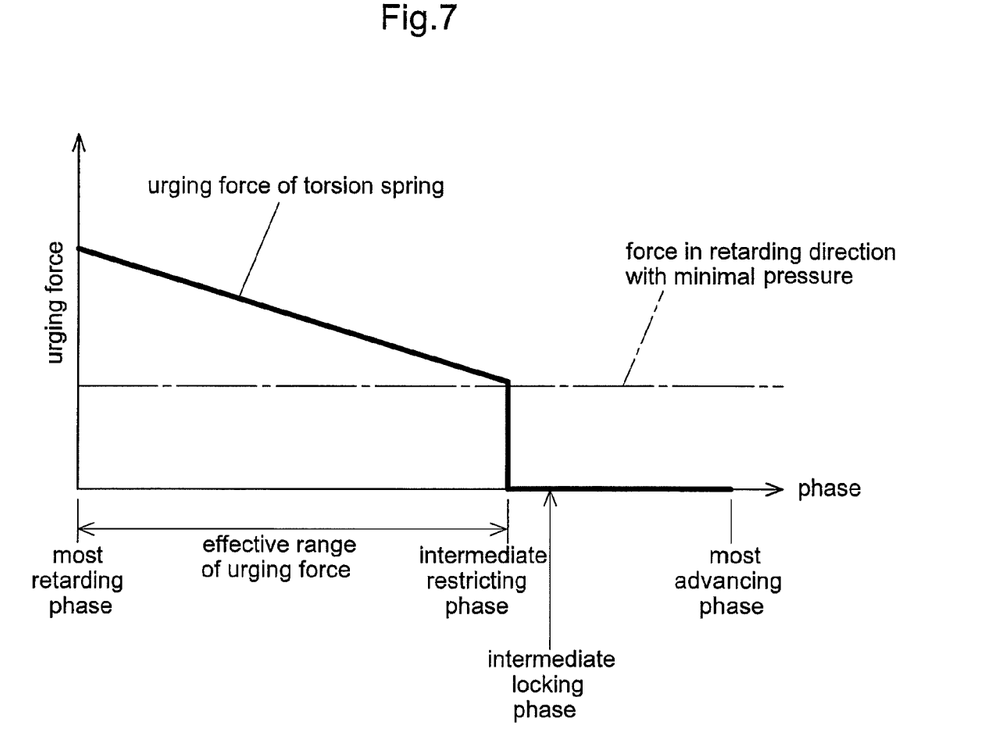
FIG. 7 is an explanatory view illustrating spring characteristics of a torsion spring.

Further, as illustrated also in FIG. 7, in this embodiment, as the torsion spring 3, there is selected a torsion spring having such strong enough spring characteristics that the minimal urging force of this torsion spring 3 in the above-described urging force effective range may exceed the displacing force in the retarding direction provided by the phase displacing mechanism 1 when fed with the work oil at the minimum pressure by the first pump 71 driven by the engine. With employment of the torsion spring 3 having such strong spring characteristics, the transition of the relative phase from the most retarding phase to the intermediate restricting phase may proceed speedily, thank to the strong assisting force provided by the torsion spring 3. Also, the transition of the relative phase from the advancing phase to the intermediate locking phase and the further transition of the same to the intermediate restricting phase may proceed speedily by the cam reaction force and the hydraulic force of the second pump 72 which is activated when needed, since in these displacement ranges, the urging force of the torsion spring 3 is not effective. Further, with the force in the retarding phase direction with the minimal pressure by the first pump 1 at the time of e.g. idling, it is difficult, because of the strong spring force of the torsion spring 3, for this force to maintain the relative phase in the retarding region from the intermediate restricting phase. Therefore, in the case of the displacement in the retarding phase direction beyond the intermediate restricting phase, the hydraulic force of the second pump 72 is utilized as an assisting force. Moreover, since the strong spring force of this torsion spring 3 provides a stopper effect at the intermediate restricting phase, in case the relative phase is displaced from the intermediate locking phase to the intermediate restricting phase, the phase retention at the intermediate restricting phase is made easy.

The locking mechanism 6 for locking the relative phase between the drive-side rotational member 12 and the driven-side rotational member 11 to the intermediate locking phase includes, as shown in FIG. 2, a retarding locking portion 6A and an advancing locking portion 6B both provided in the drive-side rotational member 12, and a locking recess 12 formed in the drive-side rotational member 11 at a part of its outermost peripheral face. The retarding locking portion 6A for restricting phase displacement toward the retarding side and the advancing locking portion 6B for restricting phase displacement toward the advancing side each includes a locking piece 60A, 40B supported on the drive-side rotational member 12 to be slidable in the radial direction and a spring 61 protruding to urge the respective locking piece 60A, 40B in the radially inner direction. The locking recess 62 extends along the peripheral direction of the driven-side rotational member 11 and is formed not as a ones-stepped recess receiving the locking piece 60A, 60B, but as a two-stepped recess having a retaining recess 62A for providing the locking function as its original function and a restriction assisting retaining recess 62a having a shallower engaging depth for engagement with the locking piece 60a than the retaining recess 62A. The restriction assisting retaining recess 62a extends in the advancing direction from the most advancing side end of the retaining recess 62M and its peripheral length corresponds to the distance between the intermediate restricting phase and the intermediate locking phase. That is to say, as may be apparent from FIGS. 2 and 4, the position where the locking piece 60A comes into contact with the end of the restriction assisting retaining recess 62a constitutes the intermediate restricting phase. Further, the bottom faces of the retaining recess 62A, the restriction assisting retaining recess 62a and a second assisting retaining recess 26b extend substantially parallel with the outermost peripheral face of the drive-side rotational member 11. Incidentally, the shapes of the locking pieces 60A, 60B can be appropriately selected from such shapes as a plate-like shape, a pin-like shape, and the like.

In operation, the retarding locking portion 6A inhibits displacement of the driven-side rotational member 11 from the intermediate locking phase toward the retarding phase side relative to the drive-side rotational member 12 by engaging the retarding locking piece 60A into the retaining recess 62M. And inhibits also displacement of the driven-side rotational member 11 toward the retarding phase side by bringing the retarding locking piece 60A into engagement with the restriction assisting retaining recess 62a. On the other hand, the advancing locking portion 6B inhibits relative rotation of the driven-side rotational member 11 relative to the drive-side rotational member 12 from the intermediate locking phase toward the advancing side by bringing the advancing locking piece 60B into engagement with the locking recess 62.

The width of the retaining recess 62M that is deeper than the restriction assisting retaining recess 62a is set to be substantially equal to the distance between lateral faces of the retarding locking piece 60A and the advancing locking piece 60B which lateral faces are remote from each other in the peripheral direction of the driven-side rotational member 11. Therefore, as shown in FIG. 2 and FIG. 5, by simultaneously engaging both the retarding locking piece 60A and the advancing locking piece 60B into the retaining recess 62M, the relative phase between the driven-side rotational member 11 and the drive-side rotational member 12 can be restricted to the intermediate locking phase having substantially zero width, i.e. the so-called locked state.

Incidentally, the locking recess 62 is communicated to the locking passage 63 formed in the driven-side rotational member 11 and this locking passage 63 is connected to the second control valve 75 of the hydraulic circuit 7. In operation, when the work oil is fed from the second control valve 75 via the locking passage 63 into the locking recess 62, the pair of locking pieces 60A and 60B which have been engaged within the locking recess 62 will be retracted toward the drive-side rotational member 12 until the leading ends thereof reach positions slightly radially more outward than the outermost peripheral face of the driven-side rotational member 11. With this, the locked state between the drive-side rotational member 12 and the driven-side rotational member 11 is released, thus allowing displacement of the relative phase.

With the valve opening/closing timing control apparatus described above, based upon result of phase detection indicative of which of the advancing or retarding phase the relative phase between the drive-side rotational member 12 and the driven-side rotational member 11 is located relative to the intermediate locking phase, this relative phase can be returned to and locked at the intermediate locking phase at the time of stopping the engine. As the phase is located at the intermediate locking phase at the time of engine stop, the engine can be re-started reliably at the intermediate locking phase suitable for starting the engine.

Next, examples of the control operations effected by the valve opening/closing timing control apparatus at the time of engine start and engine stop will be described.

(Start Control)

Figure 8:
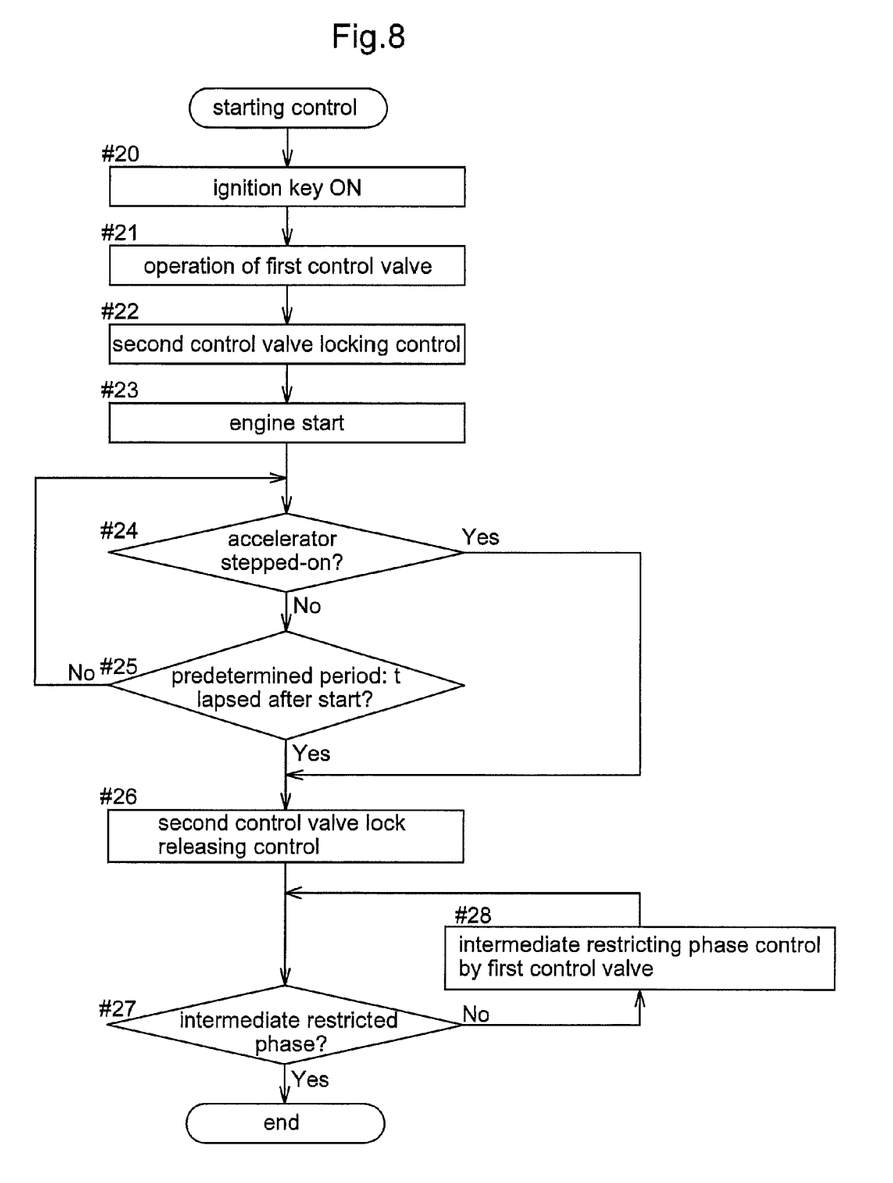
FIG. 8 is a flowchart of a starting control.

Normally, the phase is locked at the intermediate locking phase at the time of starting the engine. So, before an ON operation of the ignition key, the phase displacing mechanism 1 is under the locked state wherein the phase is restricted as being locked to the intermediate locking phase by the locking mechanism 6. Further, the first control valve 74 is located at its neutral position and the feeding/discharging of the work oil to/from the advancing chamber 2B and the retarding chamber 2A are stopped. Then, when engine start is instructed with an ON operation of the ignition key, a cranking operation by a starter motor is effected. With this, the engine is started and the first pump 71 is rotated to allow feeding of the work oil to the advancing chamber 2B and the retarding chamber 2A (#20). Further, the control unit 8 operates the first control valve 74 to fill both the retarding chamber 2A and the advancing chamber 2B with the work oil (#21). Simultaneously therewith, the control unit controls the second control valve 75 to discharge the work oil from the locking mechanism 6 (#22). With this discharging of work oil of the locking mechanism 6, at the time of engine start, the locking mechanism 6 is retained to the locked state by the force of the spring 61. Once the engine has started (#23) and enters idling rotation, the process checks whether a stepping-on operation of the accelerator pedal has been effected or not (#24). If not stepping-on operation of the accelerator pedal has been effected ("NO" branching at #24), the process further checks whether a predetermined period: (t) has lapsed or not (#25). This period: (t) is also a period when emission improvement in the intermediate restricting phase can be expected after engine start. So, this period (t) is selected preferably from 20 seconds to 30 seconds, depending on the water temperature of the engine cooling water. If the predetermined period: (t) has not yet lapsed after the engine start ("NO" branching at #25), the process jumps to step #24 to repeat the foregoing procedure. In case it was found at step #24 that a stepping-on operation of the accelerator pedal was effected ("YES" branching at step #24) or it was found at step #25 that the predetermined period (t) had lapsed after the engine start ("YES" branching at step #25), the second control valve 75 is operated to feed the work oil to the locking mechanism 6 (#26). With this feeding of the work oil to the locking mechanism 6, the locked state of the locking mechanism 6 is released. Upon this release of the locked state, the relative phase is displaced by the cam reaction force to the phase retarding direction and when the phase has reached the intermediate restricting phase, under the effect of the strong resistance from the torsion spring 3, the relative phase is maintained in the proximity of the intermediate restricting phase. The process checks whether this has been done or not (#27), if, for some reason, the relative phase is currently off the intermediate restricting phase, the control unit 8 operates the first control valve 24 to effect feeding of the work oil to the advancing chamber 2B and the retarding chamber 2A appropriately, thus adjusting the relative phase to the intermediate restricting phase (#28). Once this intermediate restricting phase is maintained, the starting control is terminated and the process goes on to the normal driving control.

(Stopping Control)

An example of the controlling operation executed by the valve opening/closing timing control apparatus at the time of stopping the engine will be explained with reference to the flowchart in FIG. 5. This stopping control process is initiated upon issuance of request for engine stopping by an OFF operation of the ignition key. At the time of OFF operation of the ignition key, in general, the engine is under its idling rotation. So, with the OFF operation of the ignition key, its rotational speed begins to decrease toward the stop state.

Figure 9:
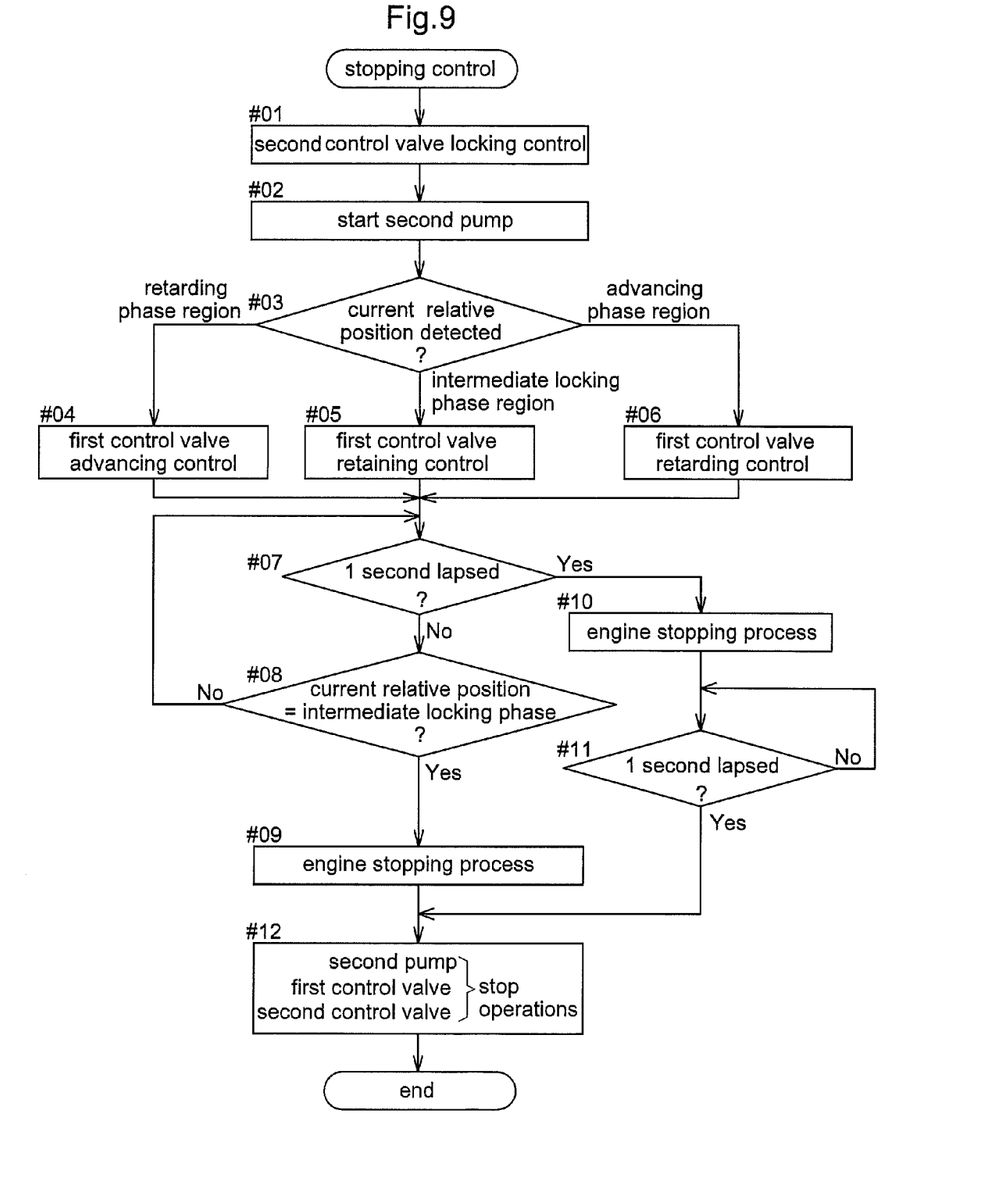
FIG. 9 is a flowchart of a stopping control.

First, upon initiation of the stopping control, the control unit 8 activates the second control valve 75 for discharging the work oil from the locking mechanism 6 and lets the movements of the locking pieces 60A and 60B of the locking mechanism 6 subjected to the force of the spring 61 in this projecting direction (#01). In order to compensate for subsequent reduction in the oil pressure due to the stop of the first pump 71 associated with the engine stop, the second pump 72 is started (#02). Then, based on signals from the sensor for detecting the crank angle and the sensor for detecting an angular phase of the cam shaft, the control unit 8 obtains a current relative phase ("current relative phase") and executes a control operation corresponding to a difference between this current relative phase and the intermediate locking phase (#03).

If the current relative phase is located in the retarding range, the process executes the advancing control for operating the first control valve 74 to feed the work oil to the advancing chamber 2B and to discharge the work oil from the retarding chamber 2A (#04). Incidentally, as this operation is executed generally while the engine is under the idling condition, there is high possibility that the relative phase is located in the proximity of the most retarding phase. In this advancing control, the force tending to displace the phase toward the intermediate locking phase as the locking position comprises the spring force of the torsion spring 3 and the hydraulic force of the second pump 72 and the fore resistant to this comprises the cam reaction force and viscosity reactive force in case the oil has high viscous load. So, there is a very strong force tending to displace the phase toward the intermediate locking phase, so that the phase will be returned to the intermediate locking phase speedily. At the initial stage of the advancing control, the advancing locking piece 60A which was engaged in advance into the retaining recess 62A will come into contact with the retarding side end of the retaining recess 62M when the advancing locking piece 60B is returned to the intermediate locking phase. Similarly, at the initial stage, the retarding locking piece 60A which was pressed against the surface of the driven-side rotational member 11 will pass the bottom face of the restriction assisting retaining recess 62a and engage into the retaining recess 62M upon returning to the intermediate locking phase and come into contact with the advancing side end of the retaining recess 62M.

In case the current relative phase is located in the intermediate locking phase region, the retaining control will be executed. In this retaining control, the first control valve 74 may be set to the neutral position and the second pump too can be stopped at this stage (#05). If the current relative phase is located in the intermediate locking phase region, this is a situation where either the retarding locking piece 60A or the advancing locking piece 60B is engaged within the retaining recess 62M or where both the retarding locking piece 60A and the advancing locking piece 60B are engaged in the retaining recess 62M. In the case of the latter situation where both the retarding locking piece 60A and the advancing locking piece 60B are engaged in the retaining recess 62M, the locking state is completed already. Whereas, in the case of the former situation where either one of the retarding locking piece 60A and the advancing locking piece 60B is engaged in the retaining recess 62M, the displacement width of the relative displacement is only the length of the retaining recess 62M. Therefore, even if the first control valve 74 and the second control valve 75 are set to the neutral position, the relative phase will be returned to the intermediate locking phase by the spring force of the torsion spring 3 and/or the cam reaction force, so that both the retarding locking piece 60A and the advancing locking piece 60B will be engaged into the retaining recess 62M.

If the current relative phase is located in the advancing region, then, the process executes a retarding control in which the first control valve 74 is operated to feed work oil to the retarding chamber 2A and to discharge work oil from the advancing chamber 2B (#06). This situation is apt to occur in such case when an OFF operation of the ignition key is effected while the engine is not under the idling state. In this retarding control, the force for displacement toward the intermediate locking phase comprises not only the hydraulic force provided by the second pump 72, but also the cam reaction force or the viscosity reaction force in the case of high oil viscous load, while the spring force of the torsion spring 3 is not involved. Therefore, the relative phase will be returned to the intermediate locking phase speedily.

After execution of one of the controls of the advancing control (#04), the retaining control (#05) and the retarding control (#06) based upon the detection result of the current relative phase, the process first checks whether a period of 1 (one) second has lapsed or not (#07). If the one-second period has not lapsed ("NO" branching at #07), the process further checks whether the current relative phase has returned to the intermediate locking phase or not (#08). If it is found that the current relative phase has returned to the intermediate locking phase and the phase is locked thereto ("YES" branching at #08), then, an engine stopping process is executed (#09). Then, the process goes on to execute completing processes such as stopping of the second pump 72, the first control valve 74, the second control valve 74 (#12). At step #07, if the one-second period has lapsed before the current relative phase returns to the intermediate locking phase ("YES" branching at #07), the process effects an engine stopping operation (#10) and then effects checking of the one-second period lapse (#11). That is, after giving the allowable extension period of one-second ("YES" branching at #11), the process jumps to step #12 to effect the completing process.

OTHER EMBODIMENTS (1) In the description of the foregoing embodiment with reference to the accompanying figures, there is provided the restriction assisting retaining recess 62a corresponding to the intermediate restricting phase of the locking mechanism 6. However, as normally the intermediate restricting position can be maintained by the stopper effect of the torsion spring 3 and the cam reaction force, the restriction assisting retaining recess 62a can be omitted. It should be noted, however, that since this restriction assisting retaining recess 62a and the assisting recess extending from the retarding side end of the retaining recess 62M toward the retarding side are convenient for the displacement process to the intermediate locking phase during the stopping control, according to one preferred mode of embodiment of the valve opening/closing timing control apparatus, not only the restricting assisting retaining recess 62a, but also the above-described further assisting retaining recess are formed on the opposed sides of the retaining recess 62A.

(2) In the description of the foregoing embodiment, the minimal urging force of the torsion spring 3 is set to exceed the displacing force in the retarding phase direction of the phase displacing mechanism 1 fed with the work fluid at the minimal pressure by the first pump 71, so that a stronger urging force than the convention could be utilized. This is because in addition to the engine-driven first pump 71, the electrically driven second pump 72 too was provided so that the assisting force of this second pump 72 enabled displacement of the relative phase to the retarding phase side against the torsion spring 3. Therefore, in case the minimal urging force of the torsion spring 3 is set to be weaker than the displacing force to the retarding direction by the phase displacing mechanism 1 fed with the work oil at the minimal pressure by the first pump 71, the second pump 72 can be omitted. Conversely, in case the arrangement does not permit use of the second pump 72, the invention can still be implemented by setting the minimal urging force of the torsion spring 3 weaker than the displacing force to the retarding direction by the phase displacing mechanism 1 fed with the work oil at the minimal pressure by the first pump 71. Even when the urging force of the torsion spring 3 is decreased, in the course of displacement from the intermediate locking phase to the intermediate restricting phase, there is provided, at the intermediate restricting phase, the stopper effect due to the resistance of the torsion spring 3, so the retention of the relative phase in the intermediate restricting region can be accomplished smoothly.

INDUSTRIAL APPLICABILITY

The present invention, as embodied as a valve opening/closing timing control apparatus capable of allowing smooth displacement of the relative phase, after engine start at the intermediate locking phase, from this intermediate locking phase to the intermediate restricting phase that is a phase slightly displaced therefrom in the retarding direction, is applicable as a peripheral device for various types of engine.

The invention claimed is:

1. A valve opening/closing timing control apparatus comprising:
   a phase displacing mechanism for displacing relative phase between a drive-side rotational member rotatable in synchronism with a crank shaft of an internal combustion engine and a driven-side rotational member arranged coaxially relative to the drive-side rotational member and rotatable in unison with a cam shaft for opening/closing at least one of an intake valve and an exhaust valve of the internal combustion engine, by feeding/discharging a work fluid to/from each one of two kinds of pressure chambers whose capacities are variable in complementing manner with each other by means of a movable partition;
   a locking mechanism capable of locking said relative phase to an intermediate locking phase suitable for starting the internal combustion engine and releasing this lock by a work fluid when needed;
   an urging mechanism configured to provide an urging function for urging said phase displacing mechanism toward an advancing side in a restricted range between an intermediate restricting phase located more on the retarding side than said intermediate locking phase and a most retarding phase; and
   wherein said locking mechanism includes:
   a first locking piece and a second locking piece which are provided on one of said drive-side rotational member and said driven-side rotational member in a spaced apart relationship in the phase displacing direction;
   a retaining recess provided in the other rotational member for allowing insertion therein of said first locking piece and said second locking piece so as to lock said relative phase; and
   a restriction assisting retaining recess having opposed ends and having a shallower depth than said retaining recess at an advancing side end thereof and configured for allowing relative displacement of said first locking piece in the retarding direction in a region from said intermediate locking phase to said intermediate restricting phase.

2. The valve opening/closing timing control apparatus according to claim 1, wherein upon lapse of a predetermined period subsequent to the start of the internal combustion engine at said intermediate locking phase, said relative phase is displaced to said intermediate restricting phase.

3. The valve opening/closing opening timing control apparatus according to any one of claim 1, further comprising:
   a first pump driven by said internal combustion engine for feeding work fluid to said phase displacing mechanism;
   a second pump driven by a drive source different from said internal combustion engine for feeding work fluid to said phase displacing mechanism; and
   wherein a minimal urging force of said urging mechanism between said intermediate restricting phase and the most retarding phase is set so as to override the displacing force toward the retarding phase side provided by said phase displacing mechanism fed with the work fluid at a minimal pressure from said first pump.

* * * * *